Nov. 8, 1938.   C. H. H. RODANET   2,135,950
ALTIMETER
Filed April 24, 1936   4 Sheets-Sheet 1

INVENTOR:
CHARLES HILAIRE HENRI RODANET
BY Haseltine Lake & Co.
ATTORNEYS

Nov. 8, 1938.   C. H. H. RODANET   2,135,950
ALTIMETER
Filed April 24, 1936   4 Sheets-Sheet 3

INVENTOR:
CHARLES HILAIRE HENRI RODANET
BY Haseltine, Lake & Co.
ATTORNEYS

Nov. 8, 1938.   C. H. H. RODANET   2,135,950
ALTIMETER
Filed April 24, 1936    4 Sheets-Sheet 4

INVENTOR:
CHARLES HILAIRE HENRI RODANET
BY Haseltine, Lake & Co.
ATTORNEYS

Patented Nov. 8, 1938

2,135,950

UNITED STATES PATENT OFFICE 2,135,950

ALTIMETER

Charles Hilaire Henri Rodanet, Neuilly-sur-Seine, France, assignor to Société Anonyme: Etablissements Ed. Jaeger, Levallois-Perret, France Application April 24, 1936, Serial No. 76,193
In France May 8, 1935

1 Claim. (Cl. 73—4)

This invention relates to altimeters.

The main object of the invention is to advantageously utilize hard stones as bearings for the various pivot pins of the movable members of the altimeter.

This arrangement has been found, in practice, to be absolutely indispensable for the construction of an apparatus, the index of which moves in a regular and smooth manner. In fact, the friction coefficient changes considerably from the state of rest to the state of movement. Consequently, the resilient diaphragm has heretofore been subjected to a resilient distortion before it could actuate the index, owing to the friction present, which, although very slight, cannot be considered as negligible with a geared up ratio. Then, when the movement had begun, the value of the friction diminished and the diaphragm could relax as a spring. The index therefore moved in jerks.

Another object of the invention provides an altimeter wherein compensation of the temperature during functioning thereof is automatically effected.

Generally speaking, the altimeter according to the invention allows:

(a) Of reducing to the minimum prejudicious resistances, (b) Of improving the accuracy of the reading, (c) Of obtaining an automatic compensation in function of the variations of the temperature, (d) Of adjusting the amplification ratio, (e) Of adjusting the position of the indicating means, (f) Of adjusting the position of the barometric scale.

The invention furthermore relates to other particular features which will appear in the following description with reference to the accompanying drawings given by way of example only and in which.

In the form of construction illustrated in Figs. 1 to 7, the vacuum box comprises a rigid bottom 1, to the periphery of which is secured, in a fluid-tight manner, by welding for instance, a corrugated metal wall 2 constituting the distortable diaphragm of said vacuum box. According to the invention, this wall 2 has a relatively great thickness, so that whatever may be its distortions, due to the variations of pressure exerted on said wall and obviously included within the limits of utilization of the altimeter, they are always inferior to the limit of the resiliency; consequently, no permanent distortion of said diaphragm is produced. Moreover, this important thickness prevents the rapid deterioration of said diaphragm under the action of atmospheric agents, as occurs when use is made of very thin diaphragms, in view of obtaining high responsiveness of the apparatus.

Figure 4:
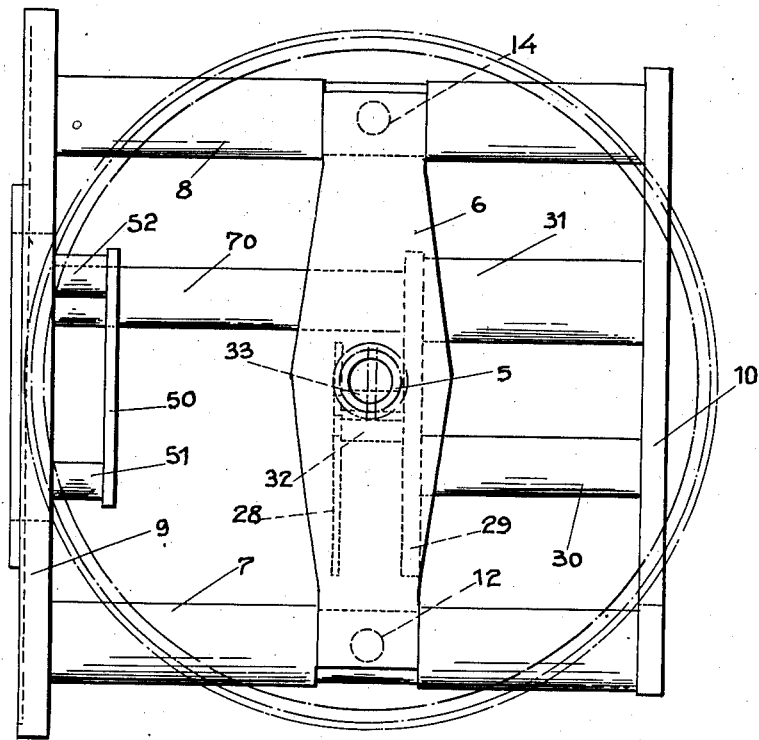
Fig. 4 is an underside plan view of the apparatus, the casing and various mechanisms being removed.
Figure 7:
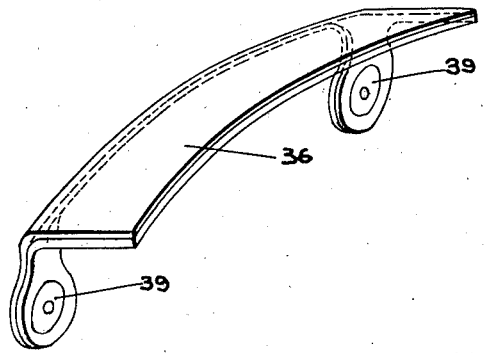
Fig. 7 is a perspective view of a form of construction of a thermostatic link.
Figure 5:
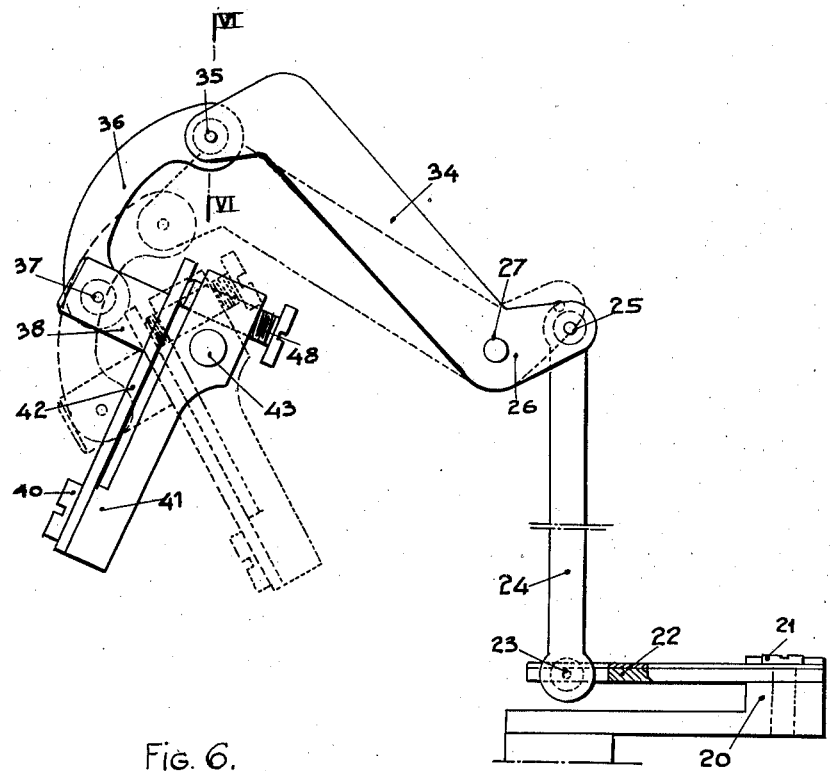
Fig. 5 is a detail view, on an enlarged scale of the amplifying device.

The rigid bottom 1 of said vacuum box comprises a boss 3 or the like forming a part of said bottom or secured on the same in a fluid-tight manner. In this boss 3 is formed an internally threaded blind hole 4 in which fits a screw 5 serving to rigidly hold a resilient blade 6. This resilient blade 6 bears at both its ends on the lower part and in two recesses formed in two rigid pillars 7 and 8 secured at their ends by any suitable means and, for instance, by riveting to the two plates 9 and 10 of the apparatus (Fig. 4). The distortion of the blade 6 is such that it tends to press the bottom 1 of the vacuum box against the upper part of the pillars 7 and 8.

Figure 1:
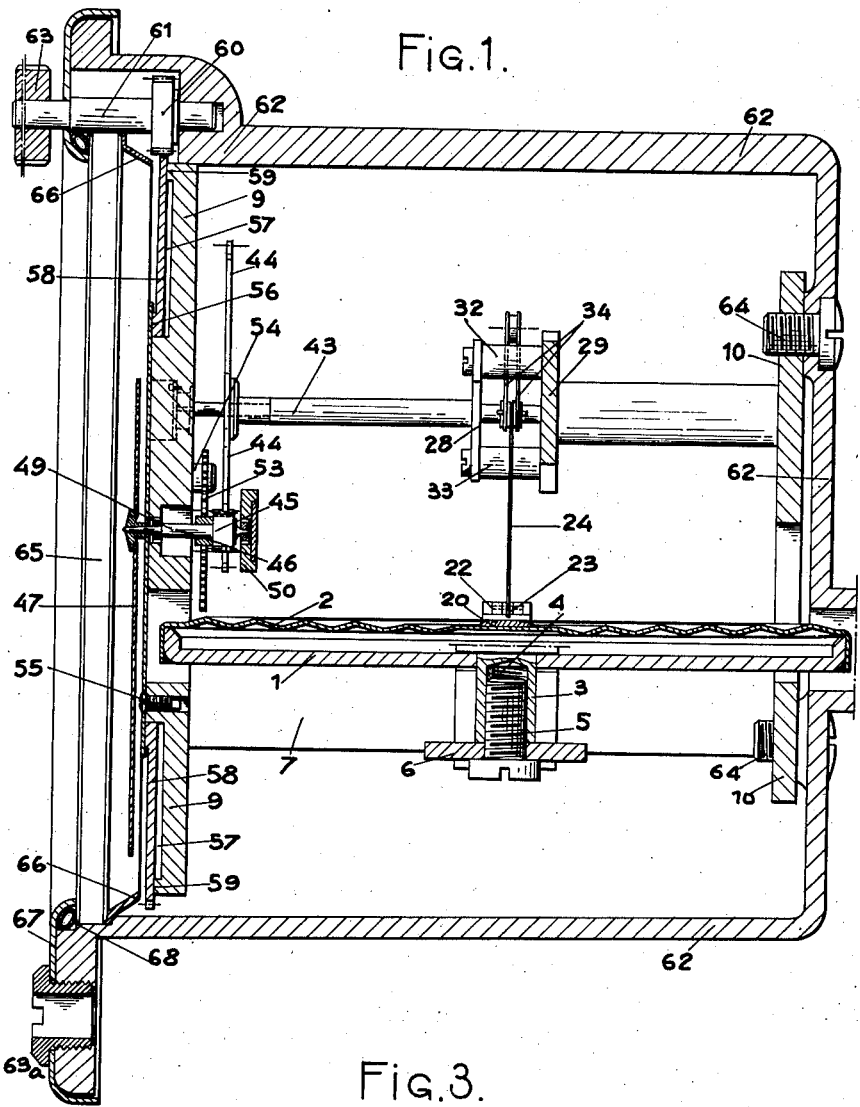
Fig. 1 is an axial section made according to line I—I of Fig. 2, of an improved altimeter according to the invention.
Figure 3:
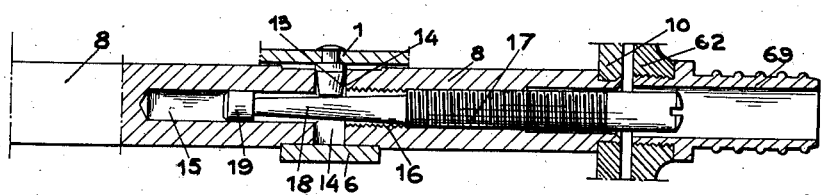
Fig. 3 is a section made according to line III—III of Fig. 2 showing the device for adjusting the position of the vacuum box.
Figure 2:
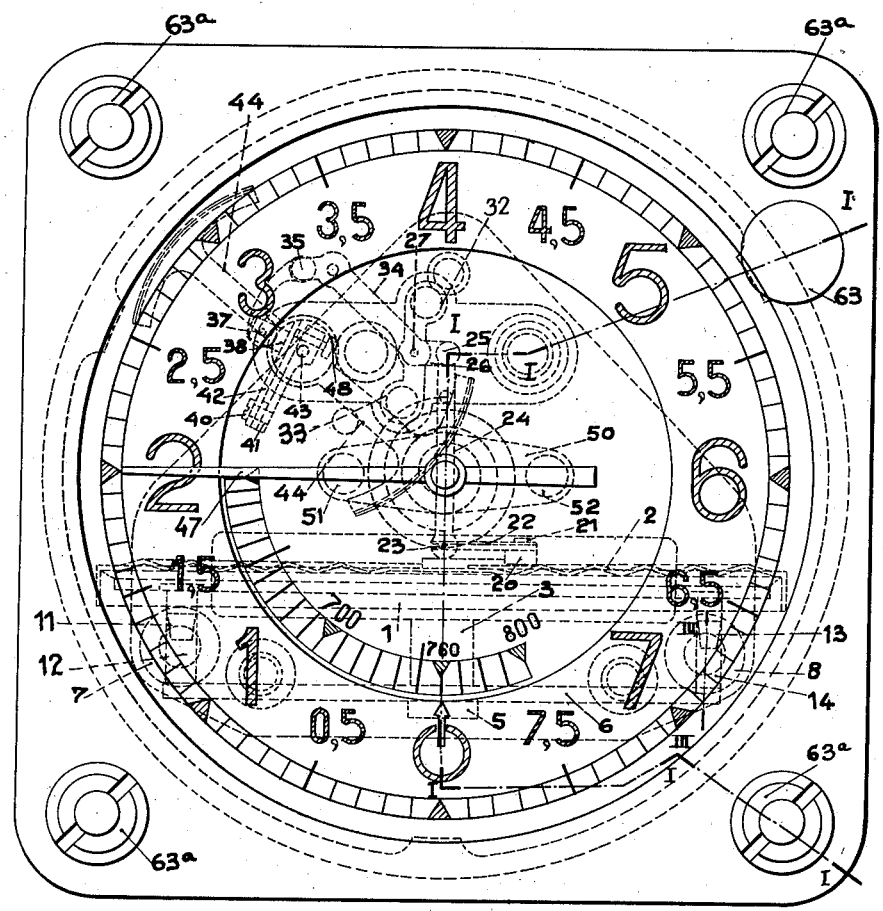
Fig. 2 is a front view thereof.

As indicated above, the bottom 1 rests only on one of the pillars, for instance the pillar 7 and it is guided and held in position by a projection 11 which enters a corresponding radial perforation 12 formed in said pillar 7. On the opposite side, the bottom 1 comprises a projection 13 which enters a radial perforation 14 formed in pillar 8 (Fig. 3). This pillar 8 has an axial bore 15 internally threaded at 16 and in which enters a corresponding screw 17. This screw 17 terminates in a conical portion 18, itself terminating in a guide and stop cylinder 19. The projection 13 is pressed, under the action of the resilient blade 6, against the conical portion 18 and it will be seen that, by suitably rotating the screw 17 determining an axial displacement of the conical portion 18, the level of the bottom 1 of the vacuum box can be adjusted relatively to pillar 8.

On the distortable wall 2 of the vacuum box 5 is secured, by any suitable means and, for instance, by welding, a lug, projection or the like 20 on the upper part of which is secured, by means of a screw 21 for instance, a bimetallic blade 22. The free end of the latter is slotted to form a fork member and receives a shaft 23 or the like, on which is journalled a link 24. The other end of this link is pivotally mounted on a shaft 25 which is secured in the arm 26 of a bell-crank lever pivoted on a fixed stud 27. This stud 27 is pivoted by means of hard stones on two plates 28 and 29 rigid together, the plate 29 being itself rendered rigid with the rear plate 10 by means of two rigid pillars 30 and 31. The plates 28 and 29 are connected by pillars 32 and 33 whilst the plates 9 and 10 are connected by the three pillars 7, 8 and 70.

Figure 6:
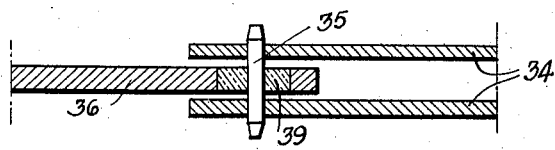
Fig. 6 is a section made according to line VI—VI of Fig. 5 and shows, on an enlarged scale, the detail of a pivotal connection of the amplifying device.

The free end of the second arm 34 of the bell-crank lever is connected, by a stud 35, to a link 36 the other end of which is pivoted, by means of a stud 37, to a fork member 38. According to the invention, the various pivotal connections of the amplifying device which has just been described are particularly carefully machined for avoiding any play. For that purpose and as shown in Fig. 6 of the drawings, which illustrates in greater detail and in section, one of the pivotal connections and that, for instance, between the arm 34 of the double bell-crank lever and the link 36, the stud 35 is secured to the arm 34 in any suitable manner, so as to avoid any play. In a suitable perforation of the link 36 is set, in the known manner, a hard stone 39 having a central perforation in which fits, without play, the stud 35 of the pivotal connection. The other pivotal connections are constituted in a similar manner.

As indicated above and according to the invention, in view of compensating the variations of distortion of the diaphragm 2 of the vacuum box for one and the same pressure when the temperature varies, the link 36 can be constituted (see Fig. 7) by a curved bimetallic blade suitably chosen so that its distortion in function of the temperature modifies the amplification ratio to an extent corresponding to the variation of distortion of the diaphragm 2 for this temperature, but with a reverse sign to said variation. In any case, hard stone or jewel bearings 39, 39 may be inserted in portions of the link to remove friction.

The fork member 38 is rigid with the end of a resilient blade 42 the other end of which is secured, by a screw 40, for instance, to the end of a rigid lever 41. This lever 41 is fast on a shaft 43 which is mounted, by means of two counter-pivots, on the plate 28, on the one hand, and on the front plate 9, on the other hand. Near the end of shaft 43 located adjacent plate 9 is secured a gear sector 44 suitably balanced and toothed at its periphery for meshing with a pinion 45 fast on a stud 46 one of the ends of which, located in front of plate 9, carries the index 47.

The blade 42 resiliently bears, at its free end, on a screw 48 screwed in a corresponding internally threaded portion of lever 41. It will be seen that by screwing or unscrewing the screw 48, the blade 42 can be respectively moved farther away or nearer, and consequently, the distance between stud 37 and shaft 43 will be increased or diminished. Consequently, it will be seen that, by suitably adjusting this screw, the adjustment of the amplification ratio of the device, is obtained.

The stud 46 on which are rigidly mounted the toothed pinion 45 and the index 47, is mounted on the front plate 9 by means of a hard stone 49 and on a plate 50 by means of a counter-pivot made of stone of the type of those used in clock-making. The plate 50 is connected to the front plate 9 by two rigid pillars 51 and 52. A spiral spring 53 restoring the index 47 to zero, has one of its ends connected to the stud 46 whilst its other end is secured to a pillar 54 mounted on the front plate 9.

The amplification ratio of the device described above is suitably determined by a judicious choice of the ratio of the arms 26 and 34 of the bell crank lever, of the distance between the stud 37 and shaft 43 and of the ratio of the gear sector 44 and pinion 45.

On the front face of the plate 9 is secured, by means of screws 55, a dial 56 comprising a graduation corresponding to the usual barometric pressures at the ground, for instance, in millimeters of mercury.

The plate 9 comprises, on its front face, a circular recess 57 concentric with the stud 46 of the index 47 and in which fits a disc 58. This disc 58 is relatively resilient so as to frictionally engage, on the one hand, with the rear face of the dial 56 and, on the other hand, with a peripheral circular projection 59 of plate 9. The disc 58 is toothed at its periphery and meshes with a pinion 60 provided on a pin 61 journalled in the casing 62 of the apparatus, the end of the pin 61 situated outside the casing 62 being provided with a milled knob 63 facilitating the rotation of said pin 61. The disc 58 carries suitable graduations opposite which moves the index 47 and which indicated preferably the altitudes directly in meters.

The casing 62, perfectly fluid-tight and preferably made in one piece, is secured, by means of three screws 64 for instance, on the rear plate 10 of the apparatus. The plate 9 preferably frictionally fits into said casing 62 the front face of which is obturated by a glass plate 65. This glass plate 65 of circular shape, fits into a suitable recess of the casing and bears against the edge of said recess preferably with interposition of a raised part 66.

The glass plate 65 is held in position by means of a rim 67 or the like secured on the casing 62 by means of screws or screw-threaded sockets 63a, or the like. In order to ensure perfect fluid-tightness, between the flange of the rim 67 and the glass plate 65 is interposed a ring 68 made of rubber or like material.

The interior of the fluid-tight casing thus constituted is placed in communication with the atmosphere by a suitable piping (not shown). It is in fact indispensable that the interior of the apparatus should be in direct communication with the atmosphere. In fact, the altimeter is usually located in the pilot's cockpit or in the cabin and this place is not usually at the same pressure as the exterior. For that purpose, the casing 62 comprises, at its rear part, a tubular connection 69 or the like on which fits the pipe communicating with the atmosphere.

According to the invention, the tubular connection 69 is arranged co-axially with the screw 17 (Fig. 3), so that for adjusting this screw, it suffices to remove the piping. Once the apparatus is adjusted, any risk of communication between the interior of the casing 62 and the atmosphere, otherwise than through the tubular connection 69, is avoided.

The operation of the altimeter according to the invention will be easily understood and does not necessitate complementary explanations. Concerning the various adjustments, the latter are effected in the following manner.

(a) *Adjustment of the amplification ratio.*—This adjustment, effected once for all, except concerning the thermostatic adjustment which, if provided, takes place automatically, is obtained by acting on the screw 48.

(b) *Adjustment of the 0 position of the altimetric graduation.*—It will be assumed that this adjustment takes place at a point situated at sea level, that is to say at zero of the altimetric scale, the operator then turns the dial 58 bearing said scale by means of the milled knob 63 so as to move the zero of the graduation opposite a point of the graduation of the barometric scale of disc 56 corresponding to atmospheric pressure at the instant and at the place considered.

If the adjustment is effected at an altitude different from zero, the graduation of the altimetric scale corresponding to this altitude is moved opposite the point of the graduation of the barometric scale corresponding to atmospheric pressure at the instant and at the place considered.

(c) *Adjustment of the 0 position of the index.*—It will be assumed that this adjustment takes place at a point situated at sea level, that is to say at zero of the altimetric scale, the operator then acts on the screw 17 until the index 47 is moved opposite the 0 of the scale.

If the adjustment is effected at an altitude different from zero, the index 47 is moved opposite the point of the graduation of the altimetric scale corresponding to the altitude where one happens to be.

Figure 8:
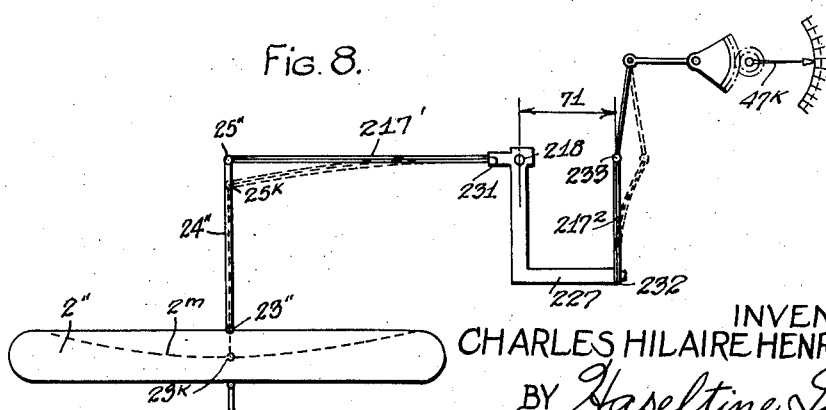
Fig. 8 is a diagrammatic view showing the use of two bimetallic blades, the displacements being exaggerated.

In the diagrammatic embodiment illustrated in Fig. 8, a device is shown allowing to effect two corrections: one ensuring the fixity of the zero, and the other correcting the length of the power transmission lever interposed between the diaphragm of the vacuum box and the movable unit controlling the indicating means.

In the example of Fig. 8, the bimetallic blade $217^1$ is rigidly secured, at 231, on a right-angled lever at 227, pivotally mounted at 218. The other end of the blade $217^1$ is pivoted, at 25'', to a link 24'' pivotally connected at 23'' to a diaphragm $2m$ of a vacuum box 2''. The bimetallic blade $217^1$ is so devised that, under the action of the temperature and for a constant pressure, it corrects the collapsing of the diaphragm. The end 25'' reaches particularly $25k$ whilst the pivotal connection 23'' reaches $23k$, the distances 25''—$25k$ and 23''—$23k$ being equal.

The bimetallic blade $217^2$ is rigidly secured at one end, at 232, to the lever 227 and it is pivotally mounted at its other end, at 233, to the members transmitting the movement to the index $47k$. This bimetallic blade $217^2$ corrects the length 71 of lever 227 for compensating the too important distortability or rigidity of the diaphragm $2m$ of the vacuum box 2'' when the pressure varies (altitude).

What I claim as my invention and desire to secure by Letters Patent is:

In an altimeter of the type having at least one vacuum box, the combination with a casing, of indicating members, an operative mechanism interposed between said vacuum box and said indicating members and comprising a motion transmitting lever, a first bimetallic blade rigidly secured at one end to said lever and at its other end having a rod by which it is articulated to said vacuum box so that said other end of the blade will follow the displacements of said vacuum box as a function of the temperature at constant pressure, and a second bimetallic blade rigidly secured at one end to said motion transmitting lever and at the other end being articulated to said operative mechanism for transmitting motion to the indicating members, said second bimetallic blade being capable of altering the effective length of said motion transmitting lever as a function of the temperature.

CHARLES HILAIRE HENRI RODANET.